US012679933B2

(12) United States Patent
Duan et al.

(10) Patent No.: US 12,679,933 B2
(45) Date of Patent: Jul. 14, 2026

(54) POLYORGANOSILOXANE AND THERMALLY CONDUCTIVE SILICONE COMPOSITION THEREOF

(71) Applicant: WACKER CHEMIE AG, Munich (DE)

(72) Inventors: Huifeng Duan, Shanghai (CN); Shuai Tian, Shanghai (CN); Kai Xu, Shanghai (CN); Heng Yang, Shanghai (CN)

(73) Assignee: WACKER CHEMIE AG, Munich (DE)

(*) Notice: Subject to any disclaimer, the term of this patent is extended or adjusted under 35 U.S.C. 154(b) by 1223 days.

(21) Appl. No.: 17/608,476

(22) PCT Filed: May 6, 2019

(86) PCT No.: PCT/CN2019/085596
§ 371 (c)(1),
(2) Date: Nov. 2, 2021

(87) PCT Pub. No.: WO2020/223864
PCT Pub. Date: Nov. 12, 2020

(65) Prior Publication Data
US 2022/0220259 A1 Jul. 14, 2022

(51) Int. Cl.
*C08G 77/08* (2006.01)
*C08G 77/12* (2006.01)
(Continued)

(52) U.S. Cl.
CPC ............. *C08G 77/08* (2013.01); *C08G 77/12* (2013.01); *C08G 77/20* (2013.01); *C08K 3/22* (2013.01);
(Continued)

(58) Field of Classification Search
CPC ........ C08G 77/08; C08G 77/12; C08G 77/20; C08K 3/22; C08K 2003/2227; C08K 2201/001; C08K 2201/005; C09K 5/14
See application file for complete search history.

(56) References Cited

U.S. PATENT DOCUMENTS

2010/0063236 A1 3/2010 Sugiura et al.
2011/0039738 A1* 2/2011 Nakayoshi ............... C09K 5/14 508/172

(Continued)

FOREIGN PATENT DOCUMENTS

CN 1803925 A 7/2006
CN 105482465 A 4/2016

(Continued)

OTHER PUBLICATIONS

CN 105838079 A translation. (Year: 2016).*

(Continued)

*Primary Examiner* — Matthew R Diaz
*Assistant Examiner* — Jiajia Janie Cai
(74) *Attorney, Agent, or Firm* — Brooks Kushman P.C.

(57) ABSTRACT

The present disclosure relates to a polyorganosiloxane comprising the following structural formula: X—$[Si(R_1)_2O]$—$[Si(R_2)_2O]_m$—$[SiR_2C_aH_{2a+1}O]_n$—$[Si(R_1)_2]$—X, where a is an arbitrary integer between 6 and 18, n is an arbitrary number between 0.7 and 20, m is an arbitrary number between 10 and 1500, m/n is an arbitrary number greater than 20, $R_1$ or $R_2$ is a C1-C5 alkyl group, X represents one or more groups selected from among C2-C6 alkenyl, alkoxy, hydroxyl and hydrogen. The polyorganosiloxane can significantly lower the viscosity, and improve the flowability and processability, of the resulting silicone composition, compared with other polyorganosiloxanes at the same thermally conductive filler loading. Meanwhile, for thermally conductive silicone compositions with the same viscosity, (Continued)

the polyorganosiloxane used as the base polymer can accept a significantly higher level of the thermally conductive fillers, thereby improving their thermal conductivity.

18 Claims, 1 Drawing Sheet

(51) Int. Cl.
*C08G 77/20* (2006.01)
*C08K 3/22* (2006.01)
*C09K 5/14* (2006.01)

(52) U.S. Cl.
CPC ........ *C09K 5/14* (2013.01); *C08K 2003/2227* (2013.01); *C08K 2201/001* (2013.01); *C08K 2201/005* (2013.01)

(56) References Cited

U.S. PATENT DOCUMENTS

2018/0030327 A1 2/2018 Zhang et al.
2019/0284494 A1* 9/2019 Ballard ................ C10M 141/12

FOREIGN PATENT DOCUMENTS

| | | | | | |
|---|---|---|---|---|---|
| CN | 105838079 | A | * | 8/2016 | |
| CN | 108503837 | A | * | 9/2018 | ............. C08G 77/06 |
| EP | 1726622 | B1 | | 9/2009 | |
| JP | 58189257 | A2 | | 11/1983 | |
| JP | 6330464 | A2 | | 11/1994 | |
| JP | 8109260 | A2 | | 4/1996 | |
| JP | 2009221310 | A | | 10/2009 | |
| JP | 2016079378 | A | * | 5/2016 | |
| JP | 6240593 | B2 | | 11/2017 | |
| JP | 2017226724 | A | * | 12/2017 | |
| KR | 20160150290 | A | | 12/2016 | |
| WO | 15022998 | A1 | | 2/2015 | |
| WO | WO-2017193174 | A1 | * | 11/2017 | ............. C08G 77/04 |
| WO | 2018016564 | A1 | | 1/2018 | |

OTHER PUBLICATIONS

CN 108503837 A translation. (Year: 2018).*
JP 2017226724 A translation. (Year: 2017).*
JP 2016079378 A translation. (Year: 2016).*
Lai Guoqiao, Xing Songmin et al.: "The method for preparing long chain alkyl silicone oil using hydrogen silicone oil as a starting material". Synthesis and Application of Organic Silicon Products [M], Beijing: Chemical Industry Press, 2009, ISBN 978-7-122-06616-9, p. 413.

* cited by examiner

POLYORGANOSILOXANE AND THERMALLY CONDUCTIVE SILICONE COMPOSITION THEREOF

FIELD OF THE INVENTION

The present disclosure relates to a polyorganosiloxane and a thermally conductive silicone composition thereof.

BACKGROUND OF THE INVENTION

Over recent years, the electric vehicle industry has rapidly grown. Power batteries are recognized as a key technology for electric vehicles. Since the increasing temperature of power battery modules can lead to deterioration of battery performance, which reduces the safety, reliability and service life of electric vehicles, heat dissipation is crucial for power batteries. Typically, the route for heat management starts from heating elements, via thermal interface materials, to a heat sink. The improvement in heat dissipation requires a reduction in the thermal resistance of thermal interface materials. In general, this can be realized by, for example, increasing the thermal conductivity, and reducing the bond line thickness, of thermal interface materials, and reducing thermal contact resistance.

Thermal interface materials are mainly composed of a polymer-based matrix and thermally conductive fillers. Since the polymer matrix, for example, organopolysiloxane, is usually not a good heat conductor, it is necessary to enhance its thermal conductivity by adding thermally conductive fillers. Attempts have been made in some prior arts.

CN1803925A discloses in Example 1 a thermally conductive silicone-molded article comprising a molded article formed from a cured product of a composition containing 100 parts of a vinyl-terminated polydimethylsiloxane having a viscosity of 600 $mm^2/s$, 400 parts of alumina, 5 parts of an organohydrogenpolysiloxane and 0.2 parts of a platinum-based catalyst, as well as a surface layer containing 100 parts of an organohydrogenpolysiloxane and 0.1 parts of a flame retardant. Although the silicone-molded article is known for its workability, heat resistance and flame retardancy, its thermal conductivity is not disclosed.

CN105838079A discloses in Example 3 a low oil bleeding thermally conductive silicone grease composition comprising 30 parts of an octyl-containing vinyl-terminated silicone oil having a viscosity of 300 cps, 0.2 parts of a hydrogen silicone oil, 0.02 parts of a platinum-based catalyst, 120 parts of quartz powder and 120 parts of alumina. The composition has a thermal conductivity of 1.85 W/m·Km.

CN105482465A discloses in Example 2 an ultralow-stress addition-curing silicone rubber composition comprising 100 parts of an octyl-containing polydimethylsiloxane with vinyl side group having a viscosity of 540 mPa·s, 12 parts of an organohydrogenpolysiloxane, 100 parts of aluminum hydroxide, 0.1 parts of a platinum-based catalyst and 10 parts of a low-stress additive. The viscosity of the composition is 1,300 mPa·s, and its thermal conductivity is not disclosed.

There are also some prior arts aimed to further improve the dispersibility of thermally conductive fillers in the base polymer, i.e., polyorganosiloxanes, where the fillers are treated with a silane coupling agent or a hydrolyzable group-containing oligosiloxane. EP1726622B1 discloses in Example 1 a thermally conductive silicone composition comprising 7.87 parts of a dimethylvinylsiloxy-terminated polydimethylsiloxane having a viscosity of 400 mPa·s, 88.5 parts of alumina, 1.2 parts of an organopolysiloxane containing vinyl groups and trimethoxysilylethyl groups for treating alumina, 0.3 parts of a copolymer of a trimethylsiloxy-terminated dimethylsiloxane and a methylhydrogensiloxane, 0.2 parts of a copolymer of a silanol-terminated dimethylsiloxane having a viscosity of 19 mPa·s and a methylvinylsiloxane, and 0.05 parts of a platinum-based catalyst. The composition has a viscosity of 60 Pa·s and a thermal conductivity of 2.7 W/m·° C.

US200180030327A discloses in Example 2B a thermal interface material comprising 4.6 parts of silicone oil A having a molecular weight of less than 50,000 Daltons, 4.6 parts of silicone oil B having a molecular weight of less than 50,000 Daltons, 90 parts of alumina, 0.5 parts of cetyltrimethoxysilane for treating alumina, 0.1 parts of a inhibitor, and 0.2 parts of a catalyst. Few oil droplets or cracks are observed on the thermal interface material after repeated thermal cycles. In its Example 2A, the U.S. application also discloses a thermal interface material comprising two silicone oils having a molecular weight of less than 50,000 Daltons and a silicone oil having a molecular weight of greater than 60,000 Daltons, which exhibits significant oil dripping and cracking after repeated thermal cycling tests. However, the patent does not disclose the thermal conductivity of the thermal interface material.

Filling the base polymers mentioned in the above patent literatures with large quantities of the thermally conductive fillers tends to increase the viscosity, and reduce the flowability, of the resulting silicone composition, and thus cannot fill up tiny gaps perfectly. In addition, the highly filled silicone composition fails to achieve a thin bond line at low assembly pressures so as to create a low thermal resistance path, thereby limiting their thermal conductivity. Therefore, it is still necessary to develop a polyorganosiloxane that has a lower viscosity even at a high filler loading to achieve better thermal conductivity.

SUMMARY OF THE INVENTION

In order to solve the above-mentioned technical problems, the present disclosure provides a polyorganosiloxane that can significantly lower the viscosity, and improve the flowability and processability, of the resulting silicone composition, compared with other polyorganosiloxanes at the same thermally conductive filler loading, which facilitates the filling of tiny gaps and achieves a thin bond line at a low assembly pressure, thereby improving the thermal conductivity of the composition. Meanwhile, for thermally conductive silicone compositions with the same viscosity, the polyorganosiloxane of the present disclosure used as the base polymer can accept a significantly higher level of the thermally conductive fillers, thereby improving their thermal conductivity.

In the present disclosure, the "structural formula" of the polysiloxane is determined by $^1H$ NMR spectroscopy (Nuclear Magnetic Resonance) and optional $^{29}Si$ NMR spectroscopy, unless otherwise specified. In $^1H$ NMR spectroscopy, hydrogen-bonded atoms and functional groups can be determined by referring to a well-known database and literature; while $^{29}Si$ NMR is further used to verify or determine hydrogen-bonded atoms and groups that cannot be accurately determined by $^1H$ NMR spectroscopy. When analyzing the molecular composition of polysiloxane, first the baseline of $^1H$ NMR spectrum is leveled then the signal peaks of different kinds of hydrogen are integrated for more than three times to find the peak area with a relative integral deviation<1%. In the case when $^{29}Si$ NMR spectroscopy is required, the signal peak area of different kinds of silicon is determined by the same method, and then the signal peak areas of hydrogen and silicon are converted in proportion to calculate the number of moles of each group unit of the polysiloxane. Finally, the structural formula of the polysiloxane is determined by end-group analysis. Generally, the structural formula determined by NMR spectroscopy is an average molecular formula. It is true that the structural formula of the polysiloxane of the present disclosure can be determined using a publicly available NMR spectroscopy method. However, in order to obtain high quality NMR spectra to facilitate the analysis of the structural formula of the polysiloxane, preference is given to deuterated chloroform as the test solvent and to tetramethylsilane (TMS)-free chloroform as the internal standard substance for $^{1}H$ NMR spectroscopy, as well as to deuterated benzene as the test solvent and to chromium acetylacetonate as the relaxation reagent for $^{29}Si$ NMR spectroscopy.

In the present disclosure, “number average molecular weight” (Mn) is determined by NMR spectroscopy, unless otherwise specified.

In the present disclosure, “dynamic viscosity” is measured at 25° C. according to DIN 51562, unless otherwise specified.

In the present disclosure, the term “particle size” refers to the equivalent diameter of particles, that is, the diameter of the homogenous spherical particles having the same or similar volume as the particles to be tested.

In the present disclosure, “in the absence of” means being present in an amount of lower than 0.1 wt %, for example, less than 0.05 wt %, or even lower than 0.01 wt %, based on the total weight of the thermally conductive silicone composition.

[Polyorganosiloxane]

The first aspect of the present disclosure provides a polyorganosiloxane having a structural formula as shown in Formula I:

I

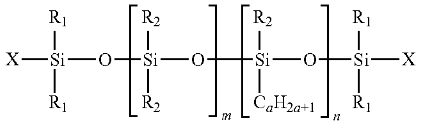

where a is an arbitrary integer between 6 and 18, n is an arbitrary number between 0.7 and 20, m is an arbitrary number between 10 and 1500, m/n is an arbitrary number greater than 20, $R_1$ is independently in each occurrence a C1-C5 alkyl group or a phenyl group, $R_2$ is independently in each occurrence a C1-C5 alkyl group, X represents one or more groups selected from among C2-C6 alkenyl, alkoxy, hydroxyl and hydrogen.

Further, in Formula I, a can be 6, 8, 10, 12, 14, 16 or 18, especially an arbitrary integer between 6 and 16, more especially an arbitrary integer between 6 and 12.

n can be an arbitrary number between 0.7 and 3, between 4 and 8, between 9 and 14, or between 15 and 20, especially an arbitrary number between 0.7 and 3, for example between 0.7 and 1.2.

m can be an arbitrary number between 10 and 220, between 220 and 380, between 380 and 660, between 660 and 850, between 850 and 1000, or between 1000 and 1500.

m/n is an arbitrary number greater than 20, for example 20, 50, 100, 150, 200, 300, 500, 700, 900, 1100, 1300, or 1500.

$R_1$ can be a methyl, ethyl, propyl, butyl, pentyl or phenyl group, preferably a methyl group.

$R_2$ can be a C1-C5 alkyl group which is the same as or different from $R_1$, preferably a methyl group.

In a preferred embodiment herein, both $R_1$ and $R_2$ are methyl.

All of the terminal group X can be C2-C6 alkenyl, for example vinyl, allyl, butenyl, preferably vinyl; alkoxy; hydroxyl; or hydrogen. Or part of the terminal group X is vinyl and the remainder is alkoxy; or part is vinyl and the remainder is hydroxyl; or part is alkoxy and the remainder is hydroxyl, or part is vinyl, part is alkoxy and the remainder is hydroxyl.

In one embodiment herein, the polyorganosiloxane has a structural formula as shown in Formula I, where a is an arbitrary integer between 6 and 18, n is an arbitrary number between 0.7 and 20, m is an arbitrary number between 10 and 380, for example between 60 and 220, and m/n is an arbitrary number between 20 and 500, for example between 50 and 300; X represents one or more groups selected from among C2-C6 alkenyl, alkoxy, hydroxyl and hydrogen. In a more particular embodiment herein, the polyorganosiloxane has a structural formula as shown in Formula I, where a is an arbitrary integer between 6 and 18, n is an arbitrary number between 0.7 and 20, m is an arbitrary number between 10 and 160, for example between 60 and 160, and m/n is an arbitrary number between 20 and 150, for example between 50 and 150; X represents one or more groups selected from among C2-C6 alkenyl, alkoxy, hydroxyl and hydrogen.

In another embodiment herein, the polyorganosiloxane has a structural formula as shown in Formula I, where a is an arbitrary integer between 6 and 18, n is an arbitrary number between 0.7 and 20, m is an arbitrary number between 380 and 850, for example between 380 and 660, and m/n is an arbitrary number between 20 and 1200, for example between 50 and 900; X represents one or more groups selected from among C2-C6 alkenyl, alkoxy, hydroxyl and hydrogen.

In still another embodiment herein, the polyorganosiloxane has a structural formula as shown in Formula I, where a is an arbitrary integer between 6 and 18, n is an arbitrary number between 0.7 and 20, m is an arbitrary number between 850 and 1500, for example between 850 and 1200, and m/n is an arbitrary number between 20 and 1700, for example between 50 and 1500; X represents one or more groups selected from among C2-C6 alkenyl, alkoxy, hydroxyl and hydrogen.

In one embodiment herein, the polyorganosiloxane has a structural formula as shown in Formula I, where a is an arbitrary integer between 6 and 18, n is an arbitrary number between 0.7 and 20, m is an arbitrary number between 10 and 1500, m/n is an arbitrary number greater than 20, and part of X are alkoxy groups. In the foregoing embodiment, in particular, at least 20 mol %, for example 35 mol % or 45 mol %, of X, based on the total number of moles of the X groups, are alkoxy groups. The percentages above are determined by $^{1}H$ NMR spectroscopy and optional $^{29}Si$ NMR spectroscopy. Specifically, it is converted by the ratio of the peak area of all hydrogen signals from the R groups in

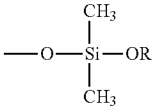

to that of all hydrogen signals from the X groups in

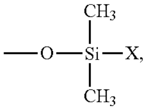

where R represents an alkyl group, X represents one or more groups selected from among vinyl, alkoxy and hydroxyl.

In another embodiment herein, the polyorganosiloxane has a structural formula as shown in Formula I, where a is an arbitrary integer between 6 and 18, n is an arbitrary number between 0.7 and 20, m is an arbitrary number between 10 and 1500, m/n is an arbitrary number greater than 20, and part of X are vinyl groups. In the foregoing embodiment, in particular, at least 45 mol %, for example 55 mol % or 65 mol %, of X, based on the total number of moles of the X groups, are vinyl groups. The percentages above are determined by $^{1}H$ NMR spectroscopy and optional $^{29}Si$ NMR spectroscopy, as described in details in the foregoing method regarding alkoxy.

In still another embodiment herein, the polyorganosiloxane has a structural formula as shown in Formula I, where a is an arbitrary integer between 6 and 18, n is an arbitrary number between 0.7 and 20, m is an arbitrary number between 10 and 1500, m/n is an arbitrary number greater than 20, and part of X are vinyl groups and part of X are alkoxy groups. In the foregoing embodiment, in particular, at least 55 mol % of X are vinyl groups and at least 35 mol % of X are alkoxy groups; or at least 45 mol % of X are vinyl groups and at least 45 mol % of X are alkoxy groups; or at least 65 mol % of X are vinyl groups and at least 20 mol % of X are alkoxy groups, all percentages being based on the total number of moles of the X groups. In any one of the foregoing embodiments, in particular, at least 55 mol % of X are vinyl groups, at least 35 mol % of X are alkoxy groups and at most 10 mol % of X are hydroxyl groups; or at least 45 mol % of X are vinyl groups, at least 45 mol % X are alkoxy groups and at most 10 mol % of X are hydroxyl groups; or at least 65 mol % of X are vinyl groups, at least 20 mol % of X are alkoxy groups and at most 10 mol % of X are hydroxyl groups, all percentages being based on the total number of moles of the X groups. The percentages above are determined by $^{1}H$ NMR spectroscopy and optional $^{29}Si$ NMR spectroscopy, as described in details in the foregoing method regarding alkoxy.

In one embodiment herein, the polyorganosiloxane has a structural formula as shown in Formula I, where a is an arbitrary integer between 6 and 18, n is an arbitrary number between 0.7 and 20, m is an arbitrary number between 10 and 1500, m/n is an arbitrary number greater than 20, and part of X are hydrogen atoms. Such polyorganosiloxane can be prepared using hydroxyl-terminated polysiloxane, dialkoxysilane or oligomer thereof, 1,1,3,3-tetramethyldisiloxane and oligomeric phosphonitrilic chloride as starting materials.

The polyorganosiloxane of the present disclosure has a dynamic viscosity at 25° C. of suitably less than 1000 mPa·s, for example, less than 900, 800, 700, 600, 500, 400, 300 or 200 mPa·s, preferably from 10 to 200 mPa·s. Where the viscosity of the polyorganosiloxane is too low, the silicone composition filled with thermally conductive fillers is prone to settling, while a too high viscosity of the polyorganosiloxane results in a silicone composition that has no significant viscosity reducing effect at the same filler loading.

The polyorganosiloxane of the present disclosure has a weight-average molecular weight (Mw) of suitably less than 60,000 g/mol, for example, less than 50,000, 40,000 or 30,000 g/mol, especially between 5,000 and 20,000 g/mol. The number-average molecular weight (Mn) is suitably less than 30,000 g/mol, for example, less than 25,000, 20,000 or 15,000 g/mol, especially between 3,000 and 10,000 g/mol. The polydispersity index Mw/Mn is suitably between 1.5 and 2.0, for example, between 1.6 and 2.0, or between 1.7 and 1.9.

The polyorganosiloxanes of the present disclosure includes a single polyorganosiloxane compound, and a combination of two or more polyorganosiloxane compounds. For each individual polyorganosiloxane molecule, m and n are integers within the above-mentioned ranges, and, in the X groups, either one listed above accounts for 100%, or one accounts for 50% and another one accounts for 50%; however, for a mixture of two or more different polyorganosiloxane compounds, m and n are positive numbers within the above-mentioned ranges, which represent an average value, and, in the X groups, percentages of individual ones listed above can be any figure in the range of 0-100%, which represent an average value and the total percentage of all X groups is 100%.

Examples of polyorganosiloxanes of the present disclosure include, but are not limited to:

$((H_2C{=}CH)(CH_3)_2SiO)_{1.54}$ $((CH_3)_2SiO)_{89.50}((CH_3)(C_8H_{17})SiO)_{0.99}(Si(OCH_3)(CH_3)_2)_{0.46}$, $((H_2C{=}CH)(CH_3)_2SiO)_{1.43}((CH_3)_2SiO)_{77.69}$ $((CH_3)(C_8H_{17})SiO)_{0.81}$ $(Si(OCH_3)(CH_3)_2)_{0.57}$, $((H_2C{=}CH)(CH_3)_2SiO)_{1.46}((CH_3)_2SiO)_{78.89}((CH_3)(C_3H_{17})SiO)_{0.81}$ $(Si(OCH_3)(CH_3)_2)_{0.54}$, $((H_2C{=}CH)(CH_3)_2SiO)_{1.00}((CH_3)_2SiO)_{150.10}(CH_3)(C_8H_{17})SiO)_{1.50}(Si(OCH_3)(CH_3)_2)_{1.00}$, $((H_2C{=}CH)(CH_3)_2SiO)_{1.20}((CH_3)_2SIO)_{133.40}((CH_3)(C_{12}H_{25})SiO)_{1.40}(Si(OCH_3)(CH_3)_2)_{0.80}$, and $((H_2C{=}CH)(CH_3)_2SiO)_{1.36}((CH_3)_2SiO)_{76.70}$ $((CH_3)(C_8H_{17})SiO)_{0.85}(Si(OCH_3)(CH_3)_2)_{0.64}$.

[Thermally Conductive Silicone Composition]

The second aspect of the present disclosure provides a thermally conductive silicone composition comprising:

a) a polyorganosiloxane according to the first aspect of the present disclosure, and b) thermally conductive fillers.

Component a)

Component a) is used as the base polymer of the thermally conductive silicone composition of the present disclosure, which can be a single polyorganosiloxane compound having the molecular structure according to the first aspect of the present disclosure, or a combination of two or more polyorganosiloxane compounds in the foregoing molecular structure.

In a preferred embodiment herein, Component a) has the structural formula as shown in Formula I, where a is an arbitrary integer between 6 and 18, m is an arbitrary number between 60 and 160, n is an arbitrary number between 0.7 and 3, m/n is an arbitrary number between 50 and 150, and at least 20 mol % of X are alkoxy groups.

In another more particular embodiment, Component a) has the structural formula as shown in Formula I, where a is an arbitrary integer between 6 and 16, m is an arbitrary number between 70 and 100, n is an arbitrary number between 0.7 and 1.2, m/n is an arbitrary number between 70 and 130, and at least 65 mol % of X are vinyl groups and at least 20 mol % of X are alkoxy groups.

Component b)

The average particle size of Component b) is not particularly limited, but it preferably ranges from 0.1 to 120 μm, further from 0.1 to 50 μm. If Component b) has an average particle size below the preferred range, the viscosity of the silicone composition will increase during the addition of Component b), while a particle size above the preferred range will leads to wider gaps between the filler particles, facilitating air adsorption, and thereby lowering the thermal conductivity. The geometry of Component b) is not particularly limited either, and can be spherical, columnar, needle-like, disc-shaped, or amorphous. Component b) can be a single filler or a mixture of two or more different fillers. When two or more different fillers are used, the average particle size may vary.

Non-limiting examples of suitable thermally conductive fillers include metals (such as aluminum, copper, nickel, gold, silver, gallium, indium, and silicon), metal oxides (such as alumina, zinc oxide, magnesium oxide, titanium oxide, iron oxide, chromium oxide, zirconium oxide, and silicon dioxide), metal nitrides (such as boron nitride, aluminum nitride, and silicon nitride), metal carbides (such as boron carbide and silicon carbide) and non-metals (such as graphite and graphene). In one embodiment herein, the thermally conductive filler is alumina. In another embodiment herein, the thermally conductive filler is a mixture of alumina and zinc oxide.

In one embodiment of the present disclosure, Component b) is a single filler having an average particle size of from 0.1 to 120 μm, for example from 0.1 to 50 μm. In another embodiment herein, Component b) comprises Filler b1), a thermally conductive filler having an average particle size of greater than or equal to 20 μm, and Filler b2), a thermally conductive filler having an average particle size of less than 20 μm. In still another embodiment herein, Component b) comprises Filler b1), a thermally conductive filler having an average particle size of greater than or equal to 20 μm and less than or equal to 100 μm, for example, greater than 30 μm and less than or equal to 60 μm, and Filler b2), a thermally conductive filler having an average particle size of greater than or equal to 0.1 μm and less than 20 μm, for example, greater than or equal to 1 μm and less than or equal to 10 μm. In both of the above embodiments, the mass ratio of Filler b1) to Filler b2) is suitably in the range of from 0.3 to 5, for example, from 0.3 to 2.

Component b) is typically used in an amount of from 25 to 3,000 parts by weight, based on 100 parts by weight of Component a). Component a) is particularly advantageously capable of lowering the viscosity of the resulting silicone composition in the presence of Component b) at high loadings, thereby improving thermal conductivity. The high loading level of Component b) can be determined by those skilled in the art according to the density of the specific thermally conductive filler and its compatibility with the polyorganosiloxane, and generally vary with the type of thermally conductive fillers. For example, if an alumina filler is used in an amount of from 750 to 1,350 parts by weight, based on 100 parts by weight of Component a), this level can be regarded as a high loading; if a boron nitride filler is used in an amount of from 100 to 150 parts by weight, based on 100 parts by weight of Component a), this level can be regarded as a high loading; and if, however, a graphite filler is used in an amount of up to 25 parts by weight, based on 100 parts by weight of Component a), this level can be regarded as a high loading.

In the present disclosure, it is not particularly limited whether or not Component b) is subjected to surface treatment. However, in order to cut production costs and avoid damage to the thermal conductivity caused by the surface treatment agent residues, preference is given to thermally conductive fillers which are not surface-treated.

In one embodiment of the present disclosure, Components a) and b) account for more than 95%, such as 96%, 97%, 98%, 99% or more, based on the total weight of the silicone composition.

In the present disclosure, the form of the thermally conductive silicone composition is not particularly limited, which can be greasy, pasty, slurry-like or clay-like at room temperature. The composition of the present disclosure can be non-curable or can be converted to a curable form by adding a crosslinking agent (Component c)) and a catalyst (Component d)). Where the composition of the present disclosure is curable, it can be cured to form a gel-like product (i.e., thermally conductive silicone gel), or a rubbery product (i.e., thermally conductive silicone rubber), wherein the curing can be carried out during the preparation of the composition, that is, the components are heat-cured after being mixed, or takes place during the use of the composition, that is, the composition is cured by the heat from the heating element; and wherein the curing mechanism is not particularly limited, and a suitable mechanism includes hydrosilylation and condensation, but a hydrosilylation reaction is preferred because it allows the composition to rapidly cure without generating by-products. The form of packaging for the curable thermally conductive silicone composition is not particularly limited, and can be supplied in one package or two packages.

Component c)

The type of the crosslinking agent can be determined according to the molecular structure of Component a), i.e. the polyorganosiloxane, more specifically, the type of the terminal group X in Component a). After Component (c) is included, the thermally conductive silicone composition of the present disclosure is converted to a curable form.

Curing of the Composition of the Present Disclosure by Hydrosilylation

More than 40 mol %, for example, more than 50 mol %, more than 60 mol %, more than 70 mol %, or even more than 80 mol %, or more than 90 mol % of the terminal group X in Component a) are vinyl groups. In a particular case, at least 65 mol % of X in Component a) are vinyl groups and at least 20 mol % of X are alkoxy groups.

In any one of the above cases, Component (c) is an organohydrogenpolysiloxane, typically including those having an average of at least three Si—H groups per molecule. The position of the Si—H groups is not particularly limited, and they can be present only as side groups, or as both side groups and end groups.

In any one of the above cases, the organohydrogenpolysiloxane has a dynamic viscosity at 25° C. of suitably from 10 to 500 mPa·s, for example, from 50 to 300 mPa·s.

The organohydrogenpolysiloxane can be used in an amount that is subject to the downstream application of the silicone composition and may or may not be excessive with respect to Component a).

Curing of the Composition of the Present Disclosure by Condensation

More than 50 mol %, for example, more than 60 mol %, more than 70 mol %, or even more than 80 mol %, or more than 90 mol % of the terminal group X in Component a) are alkoxy and/or hydroxyl groups.

In this case, Component (c) is selected from among active substances capable of undergoing a condensation reaction with silanol groups, typically including silanes containing at least three silicon-bonded hydrolyzable groups per molecule, such as multifunctional (functionality≥3) alkoxysilanes, acyloxysilanes, ketoximinosilanes and alkenyloxysilanes.

In any one of the above cases, the silane can be used in an amount that is subject to the downstream application of the silicone composition and may or may not be excessive with respect to Component a).

Component d)

The type of the catalyst can be determined according to the molecular structure of Component a), i.e. polyorganosiloxane, and the type of the crosslinking agent in Component (c), more specifically, the type of the terminal group X in Component a) polyorganosiloxane and the type of crosslinking agent in Component (c). Component (d) is primarily used to accelerate the curing of the thermally conductive silicone composition of the present disclosure.

Curing of the Composition of the Present Disclosure by Hydrosilylation

A platinum-based catalyst can be selected as Component d).

Non-limiting examples of the platinum-based catalyst include chloroplatinic acid, chloroplatinates, olefin complexes of platinum, and alkenylsiloxane complexes of platinum.

The platinum-based catalyst can be used in an amount subject to the desired curing rate, which is usually a minimum level required to ensure an effective hydrosilylation reaction.

Curing of the Composition of the Present Disclosure by Condensation

The condensation reaction catalyst is an optional component, and is not necessary generally when Component (c) is a silane with ketoximes or the like as hydrolyzable groups.

Non-limiting examples of condensation reaction catalysts include organotitanium catalysts (such as tetra-n-butyl titanate, tetraisobutyl titanate, tetra-t-butyl titanate, tetraisopropyl titanate, tetraisooctyl titanate, diisobutyl bis(acetylacetone) titanate, and diisopropyl bis(ethyl acetoacetate) titanate), and organotin catalysts (such as dibutyltin dilaurate, dioctyltin dilaurate, dibutyltin maleate, dibutyltin diacetate, dibutyltin dioctanoate, and dibutyltin diacetyl acetonate).

The condensation reaction catalyst can be used in an amount subject to the desired curing rate, which is usually a minimum level required to ensure an effective condensation reaction.

Other Optional Components

The thermally conductive silicone composition of the present disclosure can further comprise other components as needed, as long as such components do not impair the effects of the present invention. Other components that can be optionally added include filler surface treatment agents, diluents and plasticizers and reaction inhibitors, but are not limited thereto.

The filler surface treatment agents typically include silanes or siloxane oligomers having two or more, such as three, hydrolyzable groups. Silanes having two or more, especially three, hydrolyzable groups are also known as silane coupling agents, non-limiting examples of which include octyltrimethoxysilane, undecyltrimethoxysilane and cetyltrimethoxysilane. Siloxane oligomers having two or more, such as three, hydrolyzable groups, typically include siloxane oligomers containing a terminal alkoxy group or a side alkoxy group, wherein the oligomers generally have a degree of polymerization less than 100, for example, less than 80 or less than 50. Treating Component b), i.e. the thermally conductive filler, with a filler surface treatment agent can improve the dispersibility of Component b) in the base polymer. Nonetheless, in view of the excellent properties of Component a) of the present disclosure and the fact that the filler surface treatment agent residues will impair thermal conductivity and increase production costs, the thermally conductive silicone composition of the present disclosure is prepared preferably in the absence of a filler surface treatment agent.

The diluents and plasticizers herein refer to non-aqueous liquids that can reduce the viscosity and increases the flowability of the material. Non-limiting examples of suitable diluents and plasticizers include dimethyl silicone oils having a viscosity of from 10 to 5,000 mPa·s at 25° C., MDT silicone oils having a viscosity of from 15 to 300 mPa·s at 25° C., $\alpha,\omega$-dimethoxypolydimethylsiloxane having a viscosity of 5-100 mPa·s at 25° C., mineral oils having a viscosity of 10-100 mm2/s at 25° C., acetone, esters (such as phthalates, dibasic esters, phosphate esters and polyesters), and alkyl aromatic compounds (such as dodecylbenzene). Typically, it is true that diluents and plasticizers can be added to a silicone composition to reduce its viscosity at high filler loadings.

Nonetheless, in view of the excellent properties of Component a) of the present disclosure and the fact that the diluents and plasticizers, as it exudes or volatilizes, can easily form air cavities resulting in a decrease in thermal conductivity efficiency, the thermally conductive silicone composition of the present disclosure is prepared preferably in the absence of diluents and/or plasticizers.

Non-limiting examples of reaction inhibitors include acetylenic compounds (such as 3-methyl-1-butyn-3-ol, 1-ethynyl-1-cyclohexanol and 3,7,11-trimethyl-dodecyn-3-ol), polyvinyl polysiloxane, amide compounds and maleate compounds. In the hydrosilylation reaction, the vinyl-containing silicone oil reacts with the hydrogen silicone oil very quickly if no reaction inhibitors are added, affecting the pot life of the thermally conductive silicone composition.

In one embodiment of the present disclosure, the thermally conductive silicone composition comprises: 100 parts by weight of the polyorganosiloxane as shown in Formula I; and 500-1,350 parts by weight of a thermally conductive filler. In a more particular embodiment herein, the thermally conductive silicone composition comprises: 100 parts by weight of the polyorganosiloxane as shown in Formula I, where a is an arbitrary integer between 6 and 18, m is an arbitrary number between 60 and 160, n is an arbitrary number between 0.7 and 3, m/n is an arbitrary number between 50 and 150, and at least 65 mol % of X are vinyl groups and at least 20 mol % of X are alkoxy groups; and 500-1,350 parts by weight, preferably 750-1,350 parts by weight of a thermally conductive filler. In any one of the foregoing embodiments, the thermally conductive filler is alumina, or a mixture of alumina and zinc oxide.

In another embodiment of the present disclosure, the thermally conductive silicone composition comprises: 100 parts by weight of the polyorganosiloxane as shown in Formula I, 200-700 parts by weight of a thermally conductive filler, 5-15 parts by weight of a crosslinking agent and 0.1-1 parts by weight of a catalyst. In a more particular embodiment herein, the thermally conductive silicone composition comprises: 100 parts by weight of the polyorganosiloxane as shown in Formula I, where a is an arbitrary integer between 6 and 18, m is an arbitrary number between 60 and 160, n is an arbitrary number between 0.7 and 3, m/n is an arbitrary number between 50 and 150, and at least 65 mol % of X are vinyl groups and at least 20 mol % of X are alkoxy groups; 200-700 parts by weight, preferably 300-550 parts by weight of a thermally conductive filler; 5-15 parts by weight of a crosslinking agent and 0.1-1 parts by weight of a catalyst. In any one of the foregoing embodiments, the thermally conductive filler is alumina, or a mixture of alumina and zinc oxide.

[Use]

The third aspect of the present disclosure further provides uses of the thermally conductive silicone composition of the second aspect of the present disclosure as a thermal interface material for electric vehicles, electronic components, semiconductors, chips, consumer electronics, communication and computers, especially for electric vehicles where it can effectively cool batteries, ECUs, motors, electronic components, etc.

[Polyorganosiloxane Composition]

The fourth aspect of the present disclosure also provides a polyorganosiloxane composition comprising:

i) a polyorganosiloxane according to the first aspect of the present disclosure,
ii) a filler,
iii) an organohydrogenpolysiloxane, and
iv) a platinum-based catalyst, and
optionally,
v) an inhibitor, and
vi) a vinyl siloxane.

Among them, Components iii), iv) and v) are the organohydrogenpolysiloxane, platinum-based catalyst, and reaction inhibitor respectively according to the second aspect of the present disclosure; Component ii) typically comprises fumed silica and also optionally various fillers conventionally used in the art, wherein the fumed silica can be untreated, or treated with surface treatment agents, for example, methylsilanes or silazanes such as hexamethyldisilazane or tetramethyldivinyldisilazane; and Component vi) comprises one or more vinyl siloxanes, which refer to vinyl-containing polyorganosiloxanes different from Component i). In one embodiment of the present disclosure, Component vi) comprises a vinyl-terminated polyorganosiloxane having a dynamic viscosity at 25° C. of from 5,000 to 1,000,000, especially from 5,000 to 100,000 mPa·s, and also optionally a vinyl-containing polyorganosiloxane having a dynamic viscosity at 25° C. of less than 5,000 mPa·s, for example, less than 3,000 mPa·s.

The above polyorganosiloxane composition can further comprise other components as needed, but it is preferred not to add diluents and plasticizers. This low-viscosity polyorganosiloxane composition can be used for injection molding especially in injection molding machines without a screw, to make silicone rubber parts such as insulators, cable accessories, anode caps, spark plug covers, and flame-retardant wires.

The polyorganosiloxane composition can be supplied in one package or two package. In the case of a two package form, as long as Component iii) and Component iv) are not supplied in the same package, which package the other components are put in is not particularly limited. In order to facilitate injection molding, the viscosity of the stuff in the two packages should be the same or similar.

DETAILED DESCRIPTION OF THE PREFERRED EMBODIMENTS

Figure 1A:
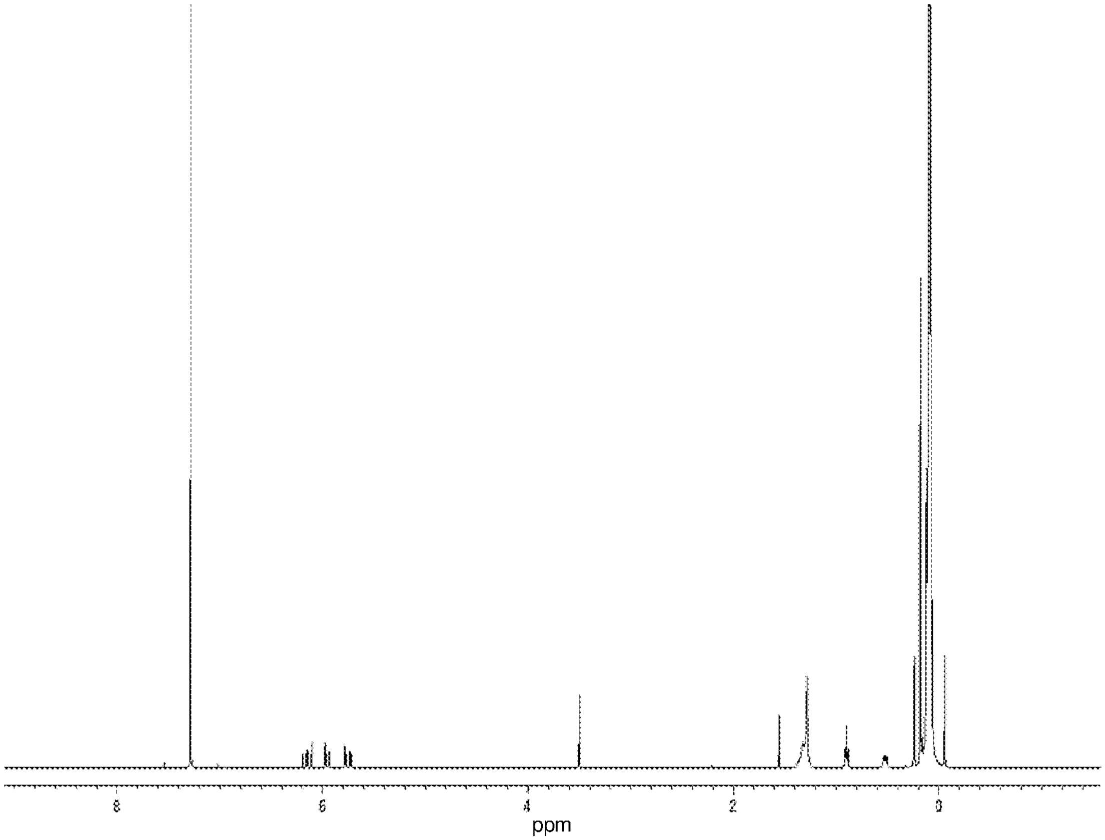
FIG. 1 shows a $^{1}H$ NMR spectrum (1a) and a $^{29}Si$ NMR spectrum (1b) of the polyorganosiloxane Polymer A-1 of Example 1.
Figure 1B:
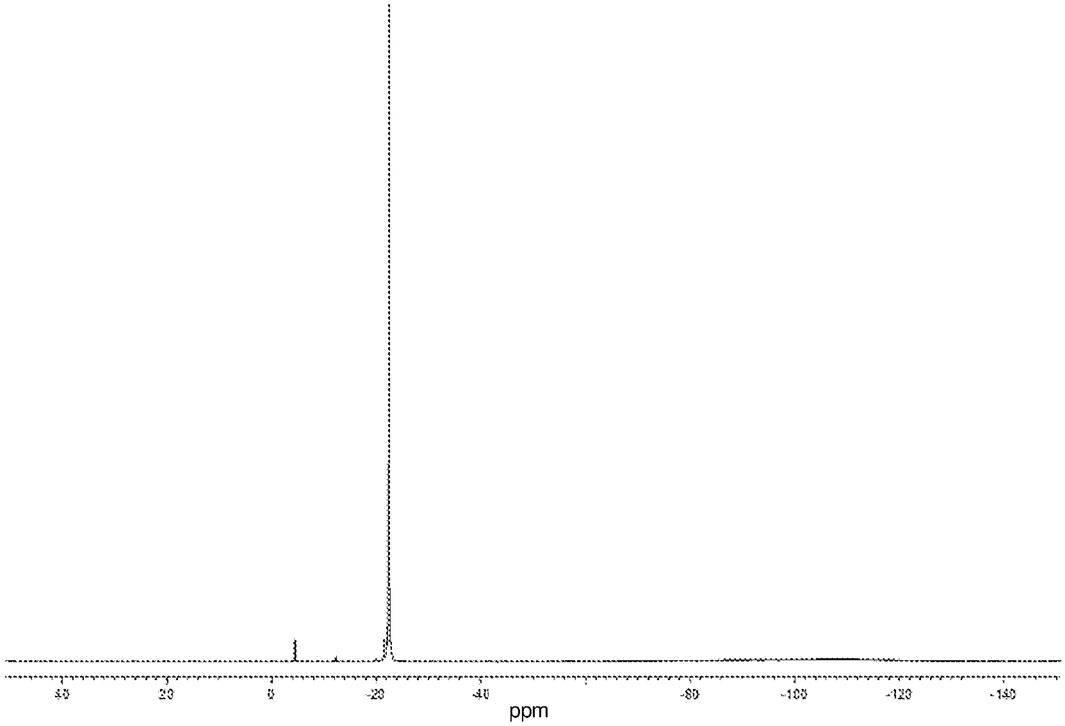

The present invention is further illustrated by the following examples, but is not limited to the scope thereof. Any experimental methods with no conditions specified in the following examples are selected according to the conventional methods and conditions, or product specifications.

Characterization of Structural Formula and Number-Average Molecular Weight of Polyorganosiloxanes Determined by $^{1}H$ NMR spectroscopy and $^{29}Si$ NMR spectroscopy.

$^{1}H$ NMR spectroscopy
Test solvent: deuterated chloroform
Internal standard substance: TMS-free chloroform
Spectrometer: Bruker Avance III HD 400
Sampling head: 5 mm BBO probe
Measured parameters:
Pulse sequence (Pulprog)=zg30
TD=65536
NS=64
DS=2
SWH=7211.54 Hz
FIDRES=0.11 Hz
AQ=4.54 s
RG=86.97
DW=69.33 μs
DE=6.50 μs
TE=298.2 K
D1=5 s
SFO1=400.15 MHz Some measurement parameters may need to be adjusted appropriately depending on the type of spectrometer.

$^{29}Si$ NMR spectroscopy
Test solvent: deuterated benzene
Relaxation reagent: chromium acetylacetonate
No internal standard substance added
Spectrometer: Bruker Avance III HD 400
Sampling head: 5 mm BBO probe
Measured parameters:
Pulse sequence=zgig60
TD=65536
NS=2048
DS=4
SWH=16025.64 Hz
FIDRES=0.24 Hz
AQ=2.04 s
RG=196.53
DW=31.20 μs
DE=13.00 μs
TE=298.1 K
D1=5 s
SFO1=79.49 MHz Some measurement parameters may need to be adjusted appropriately depending on the type of spectrometer.

Each group unit of the polyorganosiloxane and the number of moles thereof are obtained primarily by $^{1}H$ NMR integration, and the type of groups is further determined by $^{29}$Si NMR spectroscopy. When performing an integration, first the baseline of NMR spectrum is leveled, then the peak integration interval is selected, in which each peak is integrated for more than three times to calculate the average peak area with the relative deviation<1%. Finally, the molecular composition of the polysiloxane is analyzed by end-group method to obtain the structural formula of the polysiloxane, whereby its number-average molecular weight is calculated.

Determination of Viscosity of the Silicone Composition

It is carried out in accordance with DIN EN ISO 3219: Determination of viscosity of polymers and resins in the liquid state or as emulsions or dispersions using a rotational viscometer with defined shear rate (ISO 3219:1993).

The raw materials used in the Examples and Comparative Examples are all commercially available, with detailed information as follows:

WACKER® FINISH WS 62 M, a hydroxyl-terminated polydimethylsiloxane having a dynamic viscosity of 50-110 mPa·s, measured at 25° C. according to DIN 51562, supplied by Wacker Chemicals;

Basic catalyst, an aqueous solution of tetramethylammonium hydroxide at a concentration of 25 wt %;

Endcapper, vinyltetramethyldisiloxane, supplied by TCI;

ELASTOSIL® VINYLPOLYMER 120, a polydimethylsiloxane containing vinyl groups, having a dynamic viscosity of 120 mPa·s measured at 25° C., supplied by Wacker Chemicals;

Alumina A, spherical alumina powder having an average particle size of 40 μm;

Alumina B, spherical alumina powder having an average particle size of 5 μm;

Alumina C, spherical alumina powder having an average particle size of 20 μm;

Alumina D, spherical alumina powder having an average particle size of 2 μm;

Zinc oxide, non-spherical zinc oxide powder having an average particle size of 5 μm; WACKER CATALYST EP, a platinum-based catalyst, supplied by Wacker Chemicals;

Hydrogen-containing polydimethylsiloxane 1, as a chain extender, having a dynamic viscosity of about 60 mPa·s at 25° C., supplied by Wacker Chemicals;

Hydrogen-containing polydimethylsiloxane 2, as a cross-linking agent, having a dynamic viscosity of 150-240 mPa·s at 25° C., supplied by Wacker Chemicals;

WACKER INHIBITOR PT 88, an inhibitor, supplied by Wacker Chemicals;

WACKER® AK 100, a polydimethylsiloxane having a kinematic viscosity of about 100 mm$^2$/s measured at 25° C. according to DIN 53019, supplied by Wacker Chemicals.

Unless otherwise specified, "wt %" in the table below is based on the total weight of the thermally conductive silicone composition.

Example 1: Polyorganosiloxane

The polyorganosiloxanes Polymer A variants were prepared as follows.

(a) The hydroxyl-terminated polysiloxane, dialkoxysilane and basic catalyst were added to a flask under a nitrogen atmosphere, stirred and heated to 80-100° C. to carry out a polycondensation reaction for 2-4 h.

(b) The endcapper was added to the flask under a nitrogen atmosphere, and heated to 100-140° C. to carry out an equilibration reaction for 3-6 h.

(c) The resulting mixture was further heated to 160° C. to decompose the catalyst for 1 h under a nitrogen atmosphere.

(d) The above resulting mixture was transferred to a distillation flask, distilled at 17500 and 30 mbar for 2 h to remove low boilers (mostly small molecular cyclosiloxanes), and finally cooled to room temperature to obtain the polyorganosiloxane.

Table 1 lists the amount of raw materials and process parameters for each Polymer A variant.

Table 2 lists the structural formula, number-average molecular weight, and dynamic viscosity at 25° C. of each Polymer A variant determined by $^1$H NMR spectroscopy and $^{29}$Si NMR spectroscopy

TABLE 1

| | Polymer A-1 | Polymer A-2 | Polymer A-3 | Polymer A-4 |
|---|---|---|---|---|
| WACKER ® FINISH WS 62 M (Kg) | 1264 | 680 | 565 | 680 |
| Octyldimethoxymethylsilane (Kg) | 37.2 | 20 | 17 | / |
| Dodecyldiethoxymethylsilane (Kg) | / | / | / | 25 |
| Basic catalyst (Kg) | 1.05 | 0.6 | 0.62 | 0.6 |
| Endcapper (Kg) | 29.76 | 16 | 50 | 16 |
| Polycondensation temperature (° C.) | 95 | 85 | 85 | 85 |
| Polycondensation time (h) | 2 | 2 | 2 | 2 |
| Equilibration temperature (° C.) | 120 | 120 | 120 | 120 |
| Equilibration time (h) | 3.5 | 3 | 3 | 3 |

TABLE 2

| | Structural Formula | Mn (g/mol) | Viscosity (mPa · s) |
|---|---|---|---|
| Polymer A-1 | $((H_2C{=}CH)(CH_3)_2SiO)_{1.54}((CH_3)_2SiO)_{89.50}((CH_3)(C_8H_{17})SiO)_{0.99}(Si(OCH_3)(CH_3)_2)_{0.46}$ | 6989.8 | 130 |
| Polymer A-2 | $((H_2C{=}CH)(CH_3)_2SiO)_{1.46}((CH_3)_2SiO)_{78.89}((CH_3)(C_8H_{17})SiO)_{0.81}(Si(OCH_3)(CH_3)_2)_{0.54}$ | 6171.7 | 124 |
| Polymer A-3 | $((H_2C{=}CH)(CH_3)_2SiO)_{1.00}((CH_3)_2SiO)_{150.10}((CH_3)(C_8H_{17})SiO)_{1.50}(Si(OCH_3)(CH_3)_2)_{1.00}$ | 11555.4 | NA |

TABLE 2-continued

| | Structural Formula | Mn (g/mol) | Viscosity (mPa · s) |
|---|---|---|---|
| Polymer A-4 | $((H_2C{=}CH)(CH_3)_2SiO)_{1.20}((CH_3)_2SiO)_{133.40}((CH_3)(C_{12}H_{25})SiO)_{1.40}(Si(OCH_3)(CH_3)_2)_{0.80}$ | 10243.2 | 240 |

Among all the Polymer A variants, Polymer A-1 has a polydispersity index (Mw/Mn) of 1.826, which was determined by PSS SECcurity gel permeation chromatography with reference to DIN 55672, using tetrahydrofuran as the eluent.

Example 2: Non-Curable Thermally Conductive Silicone Composition

According to the formulation in Table 3, the polyorganosiloxanes Polymer A-1, Polymer B (ELASTOSIL® VINYLPOLYMER 120) and thermally conductive fillers were mixed to obtain non-curable thermally conductive silicone Compositions N-1 to N-4'. The viscosities of the compositions were measured at shear rates of 0.5 $s^{-1}$ and 25 $s^{-1}$. The results show that Polymer A-1 is more effective in reducing the viscosity of the composition than Polymer B at the same thermally conductive filler loading.

TABLE 3

| Components (wt %) | Composition N-1 | Composition N-2 | Composition N-3 | Composition N-4' |
|---|---|---|---|---|
| Polymer A-1 | 10 | 10 | 15 | / |
| Polymer B | / | / | / | 15 |
| Alumina A | 60 | / | / | / |
| Alumina B | 30 | / | 85 | 85 |
| Alumina C | / | 60 | / | / |
| Alumina D | / | 30 | / | / |
| Viscosity of Composition (mPa · s) | | | | |
| D = 0.5 $s^{-1}$ | 17600 | 41600 | 132000 | 423000 |
| D = 25 $s^{-1}$ | 13800 | 12700 | 36500 | 81300 |

According to the formulation in Table 4, the polyorganosiloxanes Polymers A-1, A-2, A-4, Polymer B and thermally conductive fillers were mixed to obtain non-curable thermally conductive silicone compositions N-5 to N-8'. The viscosities of the compositions were measured at a shear rate of 10 $s^{-1}$. The results show that Polymer A, the polyorganosiloxanes of the present disclosure, are more effective in reducing the viscosity of the composition than Polymer B at the same thermally conductive filler loading, while Polymer A-1 is slightly superior to Polymers A-2 and A-4 in reducing viscosity.

TABLE 4

| Components (wt %) | Composition N-5 | Composition N-6 | Composition N-7 | Composition N-8' |
|---|---|---|---|---|
| Polymer A-1 | 10 | / | / | / |
| Polymer A-2 | / | 10 | / | / |
| Polymer A-4 | / | / | 10 | / |
| Polymer B | / | / | / | 10 |
| Alumina A | 25 | 25 | 25 | 25 |
| Alumina B | 36 | 36 | 36 | 36 |
| Zinc oxide | 29 | 29 | 29 | 29 |
| Viscosity of Composition (mPa · s) | | | | |
| D = 10 $s^{-1}$ | 72000 | 100000 | 128000 | 580000 |

In Table 5, the viscosity reducing effect of the polyorganosiloxane Polymer A-1 is compared with that of Polymer C (a silicone oil with the structural formula $(CH_3)_3SiO((CH_3)_2SiO)_{80}((CH_3)(C_8H_7)SiO)_2Si(CH_3)_3$, characterized by NMR spectroscopy, and a dynamic viscosity of 100 mPa·s measured at 25° C., which is prepared with reference to "The method for preparing long chain alkyl silicone oil using hydrogen silicone oil as a starting material" in the last third paragraph, Page 413, *Synthesis and Application of Organic Silicon Products* [*M*], Beijing: Chemical Industry Press, 2009, Lai Guoqiao, Xing Songmin et al.) at the same thermally conductive filler loading. The results show that Polymer A-1 is more effective in reducing the viscosity than Polymer C.

TABLE 5

| Components (wt %) | Composition N-5 | Composition N-9' |
|---|---|---|
| Polymer A-1 | 10 | / |
| Polymer C | / | 10 |
| Alumina A | 25 | 25 |
| Alumina B | 36 | 36 |
| Zinc oxide | 29 | 29 |
| Viscosity of Composition (mPa · s) | | |
| D = 1 $s^{-1}$ | 422000 | 687000 |

Table 6 investigates the viscosity changes of the polyorganosiloxanes Polymer A-1 and Polymer D (WACKER® AK 100) at a thermally conductive filler loading of 90% and 91%. The results show that Polymer A-1 can significantly reduce the viscosity, and thus improve the flowability and processability, of the resulting compositions, compared with Polymer D at the same thermally conductive filler loading. In addition, for the compositions with the same viscosity, Polymer A-1 accepts a higher level of thermally conductive fillers than Polymer D, thereby increasing the thermal conductivity of the composition. It should be noted that Polymer D is well known for its bleeding-out tendency during the molding, storage and use of a thermally conductive silicone composition thereof.

TABLE 6

| Components (wt %) | Composition N-5 | Composition N-10 | Composition N-11' | Composition N-12' |
|---|---|---|---|---|
| Polymer A-1 | 10 | 9 | / | / |
| Polymer D | / | / | 10 | 9 |
| Alumina A | 25 | 25.3 | 25 | 25.3 |

TABLE 6-continued

| Components (wt %) | Composition N-5 | Composition N-10 | Composition N-11' | Composition N-12' |
|---|---|---|---|---|
| Alumina B | 36 | 36.4 | 36 | 36.4 |
| Zinc oxide | 29 | 29.3 | 29 | 29.3 |
| Viscosity of Composition (mPa · s) | | | | |
| D = 10 $s^{-1}$ | 72000 | 122000 | 130000 | 184000 |

Example 3: Curable Thermally Conductive Silicone Composition

According to the formulation in Table 7, the polyorganosiloxane Polymer A-1 and other ingredients were mixed to obtain Components A and B, which were further mixed at a mass ratio of 1:1 to obtain the curable thermally conductive silicone composition Composition C. The viscosities of Components A and B were measured at shear rates of 0.5 $s^{-1}$ and 25 $s^{-1}$. The results are shown in Table 8.

TABLE 7

| | Components (wt %) | Composition C-1 |
|---|---|---|
| Component A | Polymer A-1 | 24.92 |
| | WACKER CATALYST EP | 0.08 |
| | Alumina A | 50.00 |
| | Alumina B | 25.00 |
| | Total | 100 |
| Component B | Polymer A-1 | 10.30 |
| | Hydrogen-containing polydimethylsiloxane 1 | 10.64 |
| | Hydrogen-containing polydimethylsiloxane 2 | 1.63 |
| | WACKER INHIBITOR PT 88 | 0.17 |
| | Alumina A | 51.50 |
| | Alumina B | 25.76 |
| | Total | 100 |

TABLE 8

| Viscosity (mPa · s) | Composition C-1 Component A | Composition C-1 Component B |
|---|---|---|
| D = 0.5 $s^{-1}$ | 1820 | 2690 |
| D = 25 $s^{-1}$ | 1860 | 2430 |

The invention claimed is:

1. A polyorganosiloxane, characterized by the following structural formula:

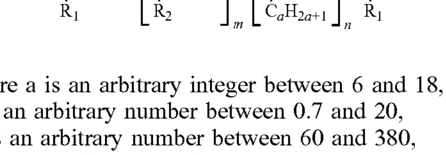

where a is an arbitrary integer between 6 and 18,
n is an arbitrary number between 0.7 and 20,
m is an arbitrary number between 60 and 380,
m/n is an arbitrary number greater than 20,
$R_1$ is independently in each occurrence a C1-C5 alkyl group or a phenyl group;
$R_2$ is independently in each occurrence a C1-C5 alkyl group;
X represents one or more groups selected from among C2-C6 alkenyl, alkoxy, hydroxyl and hydrogen and at least part of X includes alkoxy groups.

2. The polyorganosiloxane of claim 1, wherein at least 20 mol % of X, based on the total number of moles of the X groups, are alkoxy is alkoxy groups.

3. The polyorganosiloxane of claim 1, wherein at least part of X includes vinyl groups.

4. The polyorganosiloxane of claim 3, wherein at least 45 mol % of X, based on the total number of moles of the X groups, are vinyl groups.

5. The polyorganosiloxane of claim 1, wherein at least 65 mol % of X and at least 20 mol % of X, based on the total number of moles of the X groups, are respectively vinyl groups and alkoxy groups.

6. A polyorganosiloxane characterized by the following formula:

I

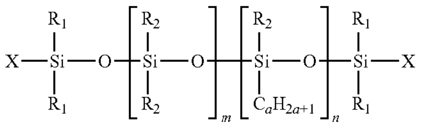

where a is an arbitrary integer between 6 and 18,
n is an arbitrary number between 0.7 and 20,
m is an arbitrary number between 60 and 380,
m/n is an arbitrary number greater than 20,
$R_1$ is independently in each occurrence a C1-C5 alkyl group or a phenyl group;
$R_2$ is independently in each occurrence a C1-C5 alkyl group;
X represents one or more groups selected from among C2-C6 alkenyl alkoxy, hydroxyl and hydrogen and at least part of X includes hydrogen atoms.

7. The polyorganosiloxane of claim 1, wherein m is an arbitrary number between 60 and 220 and m/n is an arbitrary number between 20 and 500.

8. The polyorganosiloxane of claim 7, wherein m is an arbitrary number between 60 and 160 and m/n is an arbitrary number between 50 and 150.

9. The polyorganosiloxane of claim 1, wherein the polyorganosiloxane has a dynamic viscosity of from 10 to 200 mPa·s at 25° C.

10. The polyorganosiloxane of claim 1, wherein the polyorganosiloxane has a number average molecular weight of from 3,000 to 10,000 g/mol.

11. The polyorganosiloxane of claim 1, wherein the polyorganosiloxane has a polydispersity index of from 1.6 to 2.0.

12. A thermally conductive silicone composition, comprising:
a) the polyorganosiloxane of claim 1, and
b) thermally conductive fillers.

13. The silicone composition of claim 12, wherein Component b) is used in an amount of from 25 to 3000 parts by weight based on 100 parts by weight of Component a).

14. The silicone composition of claim 12, wherein Component b) has an average particle size of from 0.1 to 120 μm.

15. The silicone composition of claim 12, wherein Components a) and b) account for more than 95 wt % of the total weight of the silicone composition.

16. The silicone composition of claim 1, further comprising:

an organohydrogenpolysiloxane, and a Pt-based catalyst.

17. The silicone composition of claim 12, wherein diluent and plasticizer are present in a total amount of less than 0.1 wt %, based on the total weight of the silicone composition.

18. The silicone composition of claim 12, wherein a filler surface treatment agent is present in an amount of less than 0.1 wt %, based on the total weight of the silicone composition.

* * * * *